United States Patent [19]
Field et al.

[11] Patent Number: 5,107,712
[45] Date of Patent: Apr. 28, 1992

[54] MODULAR JACK SPRING CONDUCTOR FORCE MEASURING PROBE

[75] Inventors: Michael D. Field, Hitchinson; Paul C. Hunt, Brainerd, both of Minn.

[73] Assignee: Communications Systems, Inc., Hector, Minn.

[21] Appl. No.: 565,555

[22] Filed: Aug. 10, 1990

[51] Int. Cl.$^5$ .................... G01L 1/22; G01L 5/00
[52] U.S. Cl. ................... 73/862.54; 73/862.65; 73/161
[58] Field of Search ........... 73/862.01, 862.54, 862.65, 73/161

[56] References Cited

U.S. PATENT DOCUMENTS

| | | | |
|---|---|---|---|
| 2,483,867 | 10/1949 | Anderson et al. | 73/161 |
| 3,282,096 | 11/1966 | Bullard et al. | 73/161 |
| 4,380,171 | 4/1983 | Smith | 73/862.65 X |
| 4,667,512 | 5/1987 | Buddwalk | 73/862.65 X |

Primary Examiner—Reinhard J. Eisenzopf
Assistant Examiner—E. L. Shopbell
Attorney, Agent, or Firm—Kinney & Lange

[57] ABSTRACT

The present invention relates to spring conductors used within modular jack assemblies. The spring conductors electrically connect with conductors residing on a multi-connector plug to connect communication equipment, digital or audio, to a transmission line. The spring conductors maintain connection with the conductors on the plug by a spring force inherent in the spring conductor. The present invention measures this spring force with a probe inserted into the modular jack assembly. The output of the probe being proportional to the spring force.

7 Claims, 2 Drawing Sheets

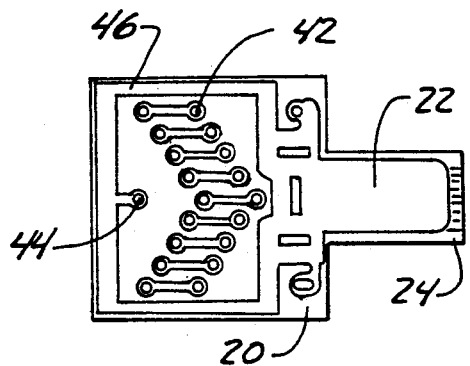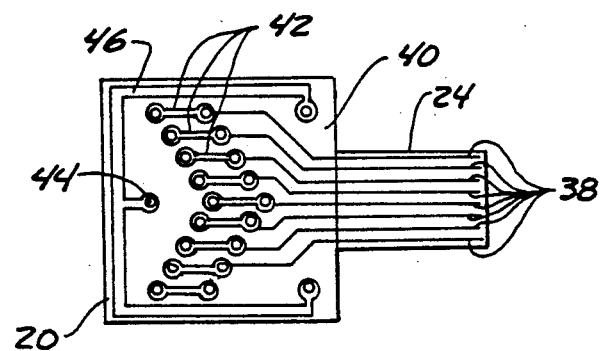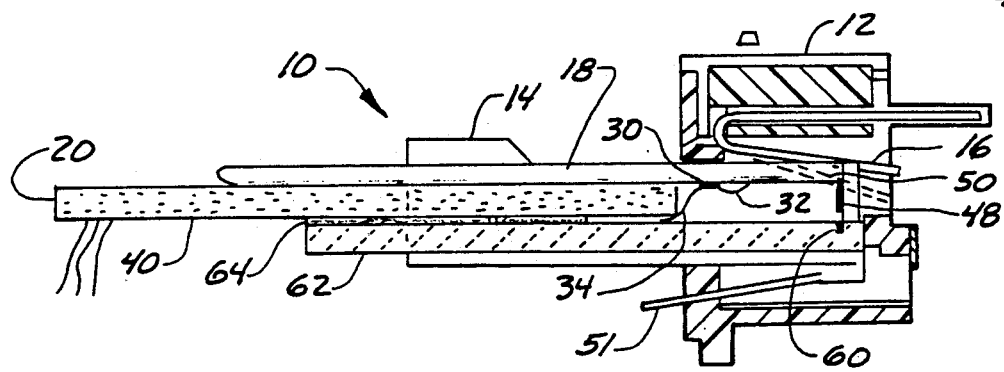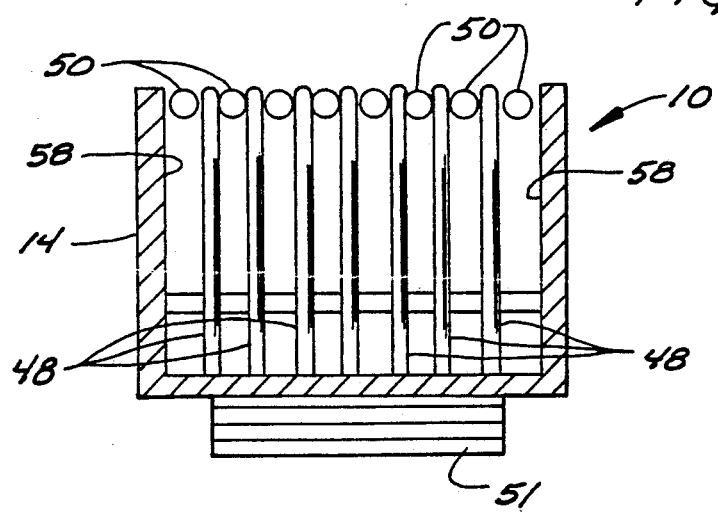

MODULAR JACK SPRING CONDUCTOR FORCE MEASURING PROBE

BACKGROUND OF THE INVENTION

The present invention relates to spring conductors used in modular jack assemblies; more particularly, the invention measures the force exerted by the spring conductors on corresponding conductors residing on a multi-connector plug inserted into the modular jack assembly.

Modular jack assemblies are used commonly throughout the communications industry to connect communication equipment, digital or audio, to a transmission line. The modular jack assembly comprises a housing with a receptacle for a multi-connector plug. Spring conductors within the receptacle make physical contact with corresponding conductors on the plug and electrically connect the communication equipment to the transmission line. The amount of spring force exerted on the plug conductors by the spring conductors is central to establishing a proper electrical connection and yet excessive force can cause excessive wear.

SUMMARY OF THE INVENTION

The present invention measures the spring force generated by the spring conductors. A spring force probe, replacing the multi-connector plug, is inserted into the receptacle of the modular jack assembly. A plurality of spring rods, positioned laterally across the top of spring force probe, make individual physical contact with the spring conductors in the receptacle. The spring force associated with the spring conductors deflects the spring rods. Resistance strain gauges located on each spring rod at the deflection point provide an output proportional to the spring force. An electronic circuit of known design provides power to the strain gauges and converts the analog output to a digital quantity, while a computer coupled to the electronic circuit displays and stores the digital spring force data. The complete system, including the spring force probe, the electronic circuit and the computer, thus provide an accurate and convenient method for testing the spring conductor spring force.

BRIEF DESCRIPTION OF THE DRAWINGS

FIG. 4A is the component side of a spring force probe circuit board used with the present invention.

FIG. 4B is the non-component side of a spring force probe circuit board shown in FIG. 4A.

FIG. 5 is a sectional view of the spring force probe of FIG. 1 inserted into a modular jack assembly.

FIG. 6 is a front view of the spring force probe of FIG. 1.

DETAILED DESCRIPTION OF THE PREFERRED EMBODIMENT

Figure 1:
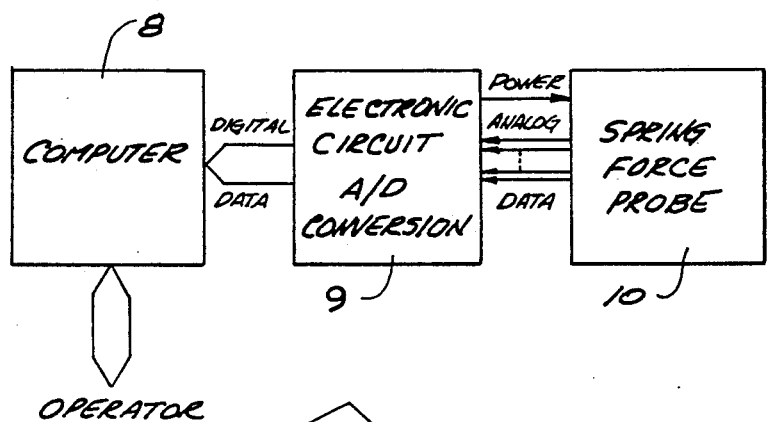
FIG. 1 is a block diagram of the spring force measuring system.

The complete spring conductor spring force measuring system as shown in FIG. 1, comprises: a spring force measuring probe 10, also called a spring force probe, an electronic circuit 9 and a computer 8. The spring force probe 10 measures and produces an analog output proportional to the spring force exerted by spring conductors of a communication jack. The electronic circuit 9 provides power to the spring force probe 10 and converts the analog spring force output to a digital quantity. The digital data is transmitted to the computer 8, where it is displayed to the operator. The computer 8 further serves as a central data storage device for spring force data gathered from several tests.

Figure 2:
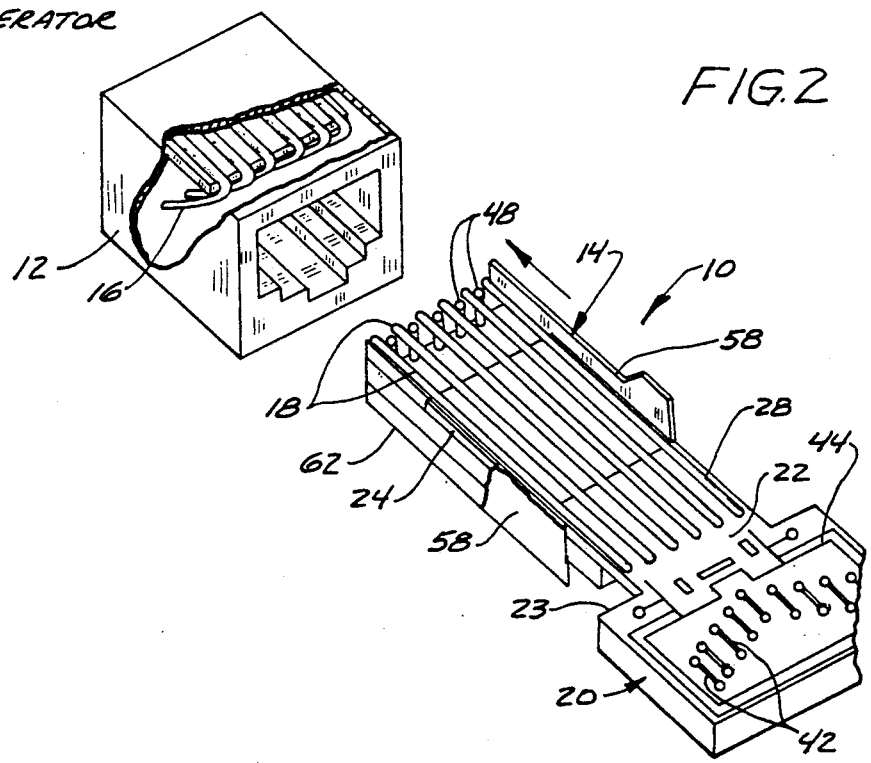
FIG. 2 is a top frontal perspective view of the spring force probe with a modular jack assembly shown adjacent to it.

FIGS. 2 and 5 show the spring force probe 10 positioned in relation to a modular jack assembly 12. The spring force probe 10 has a leading end in a housing 14 in the general shape and size of a conventional plug used for connecting communication equipment to the modular jack assembly 12. The leading end housing and the associated position of the spring force probe will slip into a modular jack assembly and is used to measure the spring force exerted generally downward by the spring conductors 16 of the jack assembly 12. This is done for quality control purposes to insure force of conductors 16.

Figure 3:
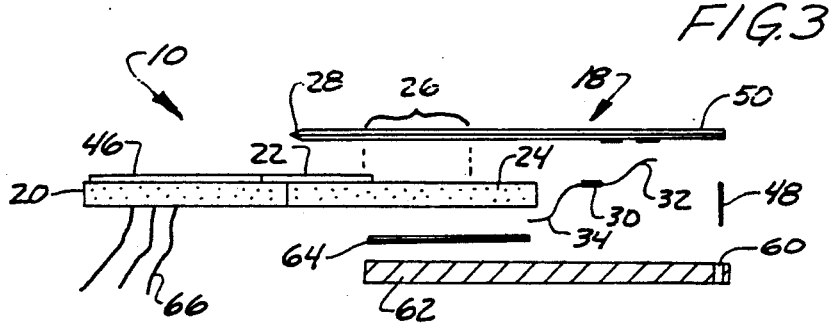
FIG. 3 is an exploded side view of the spring force probe of FIG. 1.

Referring to FIG. 3, the spring force probe 10 is shown with the parts in exploded relation. The electrically conductive spring rods 18 are epoxied to and spaced laterally across a first front mounting plate portion 24 of spring force probe circuit board 20. The spring rods 18 have stationary ends 28 which are secured to a common ground pad 22 on the circuit board 20 shown in FIGS. 2 and 4A. The circuit board 20 comprises a fiberglass resin substrate which has a wider rear or outer portion 23 and has conductive copper traces on both sides of the board. FIGS. 4A and 4B are plan views of the board 20 to show the copper traces for both the component and non-component sides of circuit board 20, respectively.

Referring back to FIG. 3, the spring rods 18 are positioned to extend beyond the front edge of front portion 24 of the circuit board 20. Since the epoxy holding the rods 18 in place is an electrical insulator, the spring rods 18 are not coated entirely with epoxy, but rather the epoxy is applied to the spring rods in the region 26 (FIG. 3). The unepoxied spring rod stationary ends 28 electrically connect the spring rods 18 with the common ground pad 22. Both the spring rod stationary ends 28 and the common ground pad 22 are coated with a conductive paint to ensure an adequate electrical connection.

The outer or leading end portions 50 of the spring rods 18, which are cantilevered from the circuit board 20, deflect at the front edge of the front portion 24 of the circuit board 20 from spring force associated with the spring conductors 16 of a standard jack to be tested, as shown in FIG. 5. Resistance strain gauges 30, shown in FIG. 5 but more clearly in FIG. 3, are mounted to the bottom surface of the free (cantilevered) portion of each individual spring rod 18. The strain gauges 30 respond to the respective spring rod deflection and provide individual outputs proportional to the downward force exerted by the aligning spring conductors 16.

Each resistance strain gauge 30 is connected to a common wire 32 and to a separate sensor or signal carrying wire 34. In the preferred embodiment, the common wire 32 is secured with conductive paint or adhesive to the bottom surface of each individual spring rod 18. The sensor wires 34, are bent downward from the respective strain gauge 30, and soldered to signal traces 38, shown in FIG. 4B, on the non-component side 40 of the circuit board 20. The spring force generated by each spring conductor 16, being proportional to either voltage across or current through each individual strain gauge 30, is provided to corresponding signal pads 42 with reference to the common ground conductor 44. A single common reference pad 44 can be used because the common wires 32 of all strain gauges 30 are electrically tied together through the spring rods 18 at the common ground pad 22. Ground traces 46 provide electrical connection between the common ground pad 22 and the common reference pad 44. The ground traces and connector pads are on the wider portion of the circuit board and are covered with a suitable housing (not shown) when in use.

Referring to FIG. 6, a greatly enlarged front view of the spring force probe 10 is shown and a plurality of upright guide posts 48 are interposed between adjacent ones of the free ends 50 of the rods 18. The guide posts 48 maintain the alignment and position of the spring rod free ends 50 for longitudinal alignment with the spring conductors 16. In the preferred embodiment, the number of posts 48 equals one less than the number of spring rods 18; thus, the outside edges of the outside spring rod free ends are aligned and guided by the inner surfaces of side walls 58 of housing 14. A conventional latch dog 51 is also shown on the bottom wall of housing 14 as used with a conventional plug to determine a home position.

Referring back to FIG. 3, the plurality of posts 48 are fixed in holes 60 drilled in a second mounting plate or comb board 62. The comb board 62 mounts under the circuit board 20 and is preferably secured with a double-sided adhesive tape. A nonconductive spacer plate 64 is positioned between the comb board 62 and the circuit board 20. The spacer plate 64 provides the proper height for mounting the comb board 62, spacer plate 64, circuit board 20, and spring rods 18 in the housing 14, as shown in FIG. 5. A housing over the outer end 23 of the circuit board is provided to protect the spring force probe assembly from physical damage.

As stated earlier, individual outputs from each strain gauge 33 are taken from the signal pads 42 with reference to the common pad 44. See FIG. 4A. Individual signal wires 66, shown in FIG. 3, are soldered to the signal pads 42 and the common pad 44 and provide the analog spring force output to the electronic circuit 8 of FIG. 1. The electronic circuit provides source power for the resistance strain gauges and analog to digital conversion of the strain gauge output using conventional circuitry. The digitized data is sent to computer 8 for display and storage. Software in the computer monitors the incoming digitized spring force data and, based on value changes in spring force, determines when the spring force probe has been inserted into the modular jack assembly, thus eliminating manual interrogation by the operator.

The plug carrying the spring rods has a snap latch to hold it in place when it is slid to a home position as is done with telephone plugs and jacks. The force exerted by the spring wires 16 of a jack can thus be measured with the probe in home position. The spring rods 18 are mounted so they replicate the position of the connector of a standard plug.

Although the present invention has been described with reference to preferred embodiments, workers skilled in the art will recognize that changes may be made in form and detail without departing from the spirit and scope of the invention.

What is claimed is:

1. A modular jack spring conductor force measuring probe, the spring force probe comprising:
   a housing providing a plug for insertion into a modular jack receptacle which has a plurality of spring conductors laterally spaced relative to the direction of insertion;
   a plurality of spring rods displaced laterally and complementary to the spring conductors, the plurality of spring rods having spring rod stationary ends mounted relative to the housing and spring rod free ends contacting the spring conductors when the spring force probe is inserted into the receptacle, each spring rod free end individually contacting a separate spring conductor; and
   means on the spring rods for measuring spring force and providing an output proportional to the spring force exerted by each individual spring conductor on each spring rod free end.

2. The spring force probe as specified in claim 1 and a first mounting plate mounted in the housing, wherein the first mounting plate mounts the spring rod stationary ends.

3. The spring force probe as specified in claim 2 and a plurality of posts interposed between the spring rod free ends, wherein the plurality of posts align and position the spring rod free ends.

4. The spring force probe as specified in claim 3 and a second mounting plate mounted adjacent the first mounting plate, wherein the second mounting plate board secures the interposed posts between the spring rod free ends.

5. The spring force probe as specified in claim 4, where the means for measuring spring force and providing an output proportional to the spring force exerted by each individual spring conductor on the spring rod free end is a plurality of resistance strain gauges individually mounted to the spring rods.

6. A modular jack spring conductor force measuring probe, the spring force probe comprising:
   a housing providing a plug for insertion into a modular jack receptacle which has a plurality of spring conductors laterally spaced relative to the direction of insertion;
   a plurality of spring rods secured to a first mounting plate inthe housing, the plurality of spring rods being cantilevered across a front edge of the first mounting plate and having spring rod stationary ends secured to the first mounting plate and spring rod free ends for individually contacting the spring conductors of a modular jack into which the plug is inserted, whereby each spring conductor of such a modular jack exerts a spring force on a spring rod free end and deflects the spring rod; and means mounted to each of the spring rods for measuring the deflection of each spring rod and provide an output proportional to the spring force.

7. A modular jack housing as specified in claim 6 and a plurality of posts mounted to the housing and interposed between the spring rod free ends, whereby the posts align and position each spring rod free end to correspond to the spacing of a spring conductor of a modular jack into which the plug is inserted.

* * * * *